(12) United States Patent
Grinwald (10) Patent No.: US 8,057,125 B2
(45) Date of Patent: Nov. 15, 2011

(54) VIBRATORY PERCUSSION RAMMERS AND METHODS OF MAKING VIBRATORY PERCUSSION RAMMERS

(75) Inventor: Anthony Grinwald, Rubicon, WI (US)

(73) Assignee: M-B-W Inc., Hartford, WI (US)

( * ) Notice: Subject to any disclaimer, the term of this patent is extended or adjusted under 35 U.S.C. 154(b) by 383 days.

(21) Appl. No.: 12/187,184

(22) Filed: Aug. 6, 2008

(65) Prior Publication Data
US 2010/0034587 A1    Feb. 11, 2010

(51) Int. Cl.
*E01C 19/32*    (2006.01)
(52) U.S. Cl. .................................................. 404/133.1
(58) Field of Classification Search ............. 404/133.05, 404/133.1, 133.2; 384/273, 300, 624
See application file for complete search history.

(56) References Cited

U.S. PATENT DOCUMENTS

| | | | |
|---|---|---|---|
| 2,675,283 A |   | 4/1954 | Thomson |
| 2,851,314 A | * | 9/1958 | Thomson ...................... 384/222 |
| 3,162,102 A | * | 12/1964 | Juneau ....................... 404/133.1 |
| 3,277,801 A | * | 10/1966 | Horvath et al. ............ 404/133.1 |
| 3,473,060 A | * | 10/1969 | Powell ............................ 310/97 |
| 3,538,821 A | * | 11/1970 | Waschulewski et al. .. 404/133.1 |
| 3,635,132 A | * | 1/1972 | McIlrath et al. ........... 404/133.2 |
| 3,734,585 A | * | 5/1973 | Conru ........................... 384/298 |
| 3,756,735 A | * | 9/1973 | Linz ......................... 404/133.05 |
| 4,005,944 A | * | 2/1977 | Harris ........................ 404/133.2 |
| 4,109,978 A | * | 8/1978 | Ernst et al. .................... 384/282 |
| 4,514,097 A | * | 4/1985 | Daly ............................... 384/93 |
| 4,518,205 A |   | 5/1985 | Heathe |
| 4,750,847 A |   | 6/1988 | Boyd |
| 4,770,546 A | * | 9/1988 | Pentz et al. .................... 384/273 |
| 4,865,467 A | * | 9/1989 | Becker et al. ................ 384/273 |
| 4,895,478 A |   | 1/1990 | Artzberger |
| 5,340,233 A |   | 8/1994 | Motl |
| 5,564,853 A | * | 10/1996 | Maughan ...................... 403/137 |

(Continued)

FOREIGN PATENT DOCUMENTS

GB    1103714 A    2/1968

OTHER PUBLICATIONS

UK Search Report for corresponding application GB 0911112.1 dated Sep. 3, 2009.

(Continued)

*Primary Examiner* — Robert Pezzuto
*Assistant Examiner* — Matthew Troutman
(74) *Attorney, Agent, or Firm* — Andrus, Sceales, Starke & Sawall, LLP (57) ABSTRACT

Vibratory percussion rammers and methods of making vibratory percussion rammers are provided. In one example, a vibratory percussion rammer includes a gear box, a percussion delivery unit extending downwardly from the gear box, and one or more slide bearings disposed in the percussion delivery unit between adjacent surfaces of reciprocating metal components. The slide bearings include a sheet of non-metal material that is curved into the shape of a tube having a C-shape in cross section. Slide bearings according to this design can be disposed in the percussion delivery unit to eliminate some or all of the metal-on-metal contact between reciprocating components, including between the ram and shaft assembly, spring box and the guide cylinder, the spring separator and the spring box, and the shaft of a ram and shaft assembly and an upper end of the spring box.

2 Claims, 8 Drawing Sheets

U.S. PATENT DOCUMENTS

| | | | |
|---|---|---|---|
| 5,880,043 A * | 3/1999 | Lorenz et al. | 442/94 |
| 6,227,760 B1 * | 5/2001 | Togami et al. | 404/84.1 |
| 6,443,651 B1 | 9/2002 | Greppmair | |
| 6,464,396 B1 * | 10/2002 | Schubert et al. | 384/273 |
| 6,548,188 B1 * | 4/2003 | Yanase et al. | 428/626 |
| 6,749,365 B2 | 6/2004 | Sina et al. | |
| 7,540,336 B2 * | 6/2009 | Steffen | 173/162.1 |
| 7,682,102 B1 * | 3/2010 | Burke et al. | 404/133.1 |
| 2005/0141791 A1 * | 6/2005 | Roos et al. | 384/300 |

OTHER PUBLICATIONS

MBW, Inc., Compaction & Concrete Construction Equipment, 2007; Wisconsin Cyberlynk Network Inc.

* cited by examiner

VIBRATORY PERCUSSION RAMMERS AND METHODS OF MAKING VIBRATORY PERCUSSION RAMMERS

FIELD

The present application relates to vibratory percussion rammers and more specifically to wear components for vibratory percussion rammers.

BACKGROUND

Vibratory percussion rammers (hereinafter "rammers") are used in the construction industry to compact soil and other loose materials. A typical rammer provides a generally vertical movement to a ground-engaging shoe that compacts the ground with a pounding type of movement. Conventional rammers include a motor-driven gearbox and a handle that is grasped by the operator. A percussion delivery unit is suspended from the gearbox and typically includes a ram and shaft assembly that extends downwardly from the gearbox into a guide cylinder, a spring box that extends upwardly into the guide cylinder, and a spring separator that is connected to the ram and shaft assembly and disposed in the spring box between upper and lower springs. The ram and shaft assembly is typically connected via a connecting rod and gear drive to the output shaft of an engine that is mounted on the gearbox. The ram and shaft assembly is driven to reciprocate up and down and the spring box is configured to reciprocate divergently relative to the reciprocations of the ram and shaft assembly. The lower end of the spring box typically carries the ground engaging shoe. Alignment of the percussion delivery unit is maintained by metal-on-metal contact surfaces such as between the ram and the guide cylinder, the spring box and the guide cylinder, (optionally, the shaft and the upper end of the spring box), and the spring separator and the interior of the spring box.

The assignee for this application, M-B-W Inc., manufactures and sells uniquely designed rammers that have low cost, easily replaced, non-metallic wear components including slide bearings and spring separators for reducing internal wear between high tolerance, costly reciprocating metal components, namely the ram and the guide cylinder, spring box and guide cylinder and the spring separator and spring box.

The present application derives from the inventor's recognition of problems associated with manufacture and use of the assignee's uniquely designed rammers and the unique wear components associated with these rammers. For example, the inventor has determined that the assignee's wear components are difficult to efficiently manufacture and install. The assignee's slide bearings are machined from extruded polyethylene tube to a size that will fit and function properly in the percussion delivery unit. Both the extrusion process and the machining process are expensive and time consuming. The combination of both processes is especially expensive and time consuming. The machining process is particularly difficult because the slide bearings are self lubricating, flexible, difficult to handle, chuck, and cut, and are subject to volumetric instability with temperature change. For the above reasons and because of the length of the wear surfaces between the guide tube and the ram and spring box assemblies, the inventor has found that it is difficult and not economically feasible to machine a single wear component or slide bearing from extruded polyethylene tube or other thin bearing material capable of reducing wear along the entire length of the delivery unit wear surface. Rather it has been necessary to make several relatively shorter slide bearings which are spaced or stacked together in series along the interior length of the guide tube. Each of these wear components must be separately extruded and machined, further adding to the cost and time of manufacture.

The inventor has also determined that its non-metallic slide bearings are subject to breakdown. For example, during rammer operation, a stacked series of slide bearings is subjected to friction and heat emanating from reciprocating components of the delivery system as well as heat generated by the engine, clutching mechanism and gear box. As heat increases, the slide bearings tend to expand and as heat decreases, the slide bearings tend to contract. Occasionally adjacent slide bearings are forced into each other, overlapping or deforming and seizing up the delivery unit. Also, as the slide bearings expand in response to the system heat, there is an increased likelihood of expansion beyond the limit provided for in the machining of adjacent metal components, thereby seizing up the delivery unit. These breakdowns require the owner to disassemble the machine, replace the disfigured slide bearings, and reassemble the machine, thus costing time and money.

SUMMARY

In the following description, certain terms have been used for brevity, clearness and understanding. No unnecessary limitations are to be implied therefrom beyond the requirement of the prior art because such terms are used for descriptive purposes only and are intended to be broadly construed. The different apparatus, systems and method steps described herein may be used alone or in combination with other apparatus, systems and method steps. It is to be expected that various equivalents, alternatives and modifications are possible within the scope of the appended claims.

In one example, a vibratory percussion rammer includes a motor-driven gear box, and a percussion delivery unit extending downwardly from the gear box, the percussion delivery unit including (1) a ram and shaft assembly extending downwardly from the gear box into a guide cylinder, (2) a spring box extending upwardly into the guide cylinder, and (3) a spring separator coupled to the ram and shaft assembly and disposed in the spring box between upper and lower springs. The ram and shaft assembly is configured to reciprocate up and down and the spring box is configured to reciprocate divergently relative to the reciprocations of the ram and shaft assembly. One or more slide bearings are disposed in the percussion delivery unit between adjacent surfaces of reciprocating metal components. The slide bearings each comprises a sheet of non-metal material that is curved into the shape of a tube having a C-shape in cross section. Preferably, the slide bearings define an open seam extending through the entire length of the slide bearing. Slide bearings can be disposed in the delivery unit to prevent some or all metal-on-metal contact between adjacent reciprocating components, such as for example between the ram and guide cylinder, spring box and the guide cylinder, between the spring separator and the spring box, and/or between a shaft of the ram and shaft assembly and the upper end of the spring box. The non-metal material can for example comprise ultra-high molecular weight polyethylene, polytetrafluoroethylene, or other suitable materials.

In another example, a method of making a vibratory percussion rammer includes the steps of (1) providing a motor-driven gear box and a percussion unit extending downwardly from the gear box, the percussion unit including a ram and shaft assembly extending downwardly from the gear box into a guide cylinder, a spring box extending upwardly into the guide cylinder, and a spring separator coupled to the ram and shaft assembly and disposed in the spring box between upper and lower springs, wherein the ram and shaft assembly are configured to reciprocate up and down and the spring box is configured to reciprocate divergently relative to the reciprocations of the ram and shaft assembly; (2) forming one or more slide bearings out of a sheet of non-metal material by forming the sheet into the shape of a tube having a C-shape in cross section; and (3) inserting the sheet into the percussion delivery unit between adjacent surfaces of reciprocating metal components. In one example, the sheet is punched from a stock of non-metal material and formed into a tube by wrapping the sheet around a cylindrical mandrel having an outer diameter that is substantially the same as the outer diameter of the spring separator. In further examples, slide bearings are disposed between some or all reciprocating metal components in the percussion delivery unit, such as between the ram and guide cylinder, guide cylinder and the spring box, between the spring separator and the spring box, and/or between the upper portion of the spring box and a shaft of the ram and shaft assembly. The step of forming the slide bearings may include heating the sheet before forming.

BRIEF DESCRIPTION OF THE DRAWINGS

The best mode of carrying out the invention is described with reference to the following drawing figures.

DETAILED DESCRIPTION OF THE DRAWINGS

FIGS. 1-4 depict a vibratory percussion rammer 20 for use in the construction industry to compact soil and other loose materials. The rammer 20 includes a handle 22, a gearbox 24, a percussion delivery unit 26 extending downwardly from the gearbox 24, and a ground engaging shoe 27. In the example shown, the percussion delivery unit 26 includes a ram and shaft assembly 28 extending downwardly from the motor-driven gearbox 24 into a guide cylinder 30, a spring box 32 extending upwardly into the guide cylinder 30, and a spring separator 34 coupled to the ram and shaft assembly 28 and disposed in the spring box 32 between upper and lower spring assemblies 36, 38. Spring assemblies 36, 38 are enclosed in the spring box 32 by a cover 44. The spring separator 34 is held in a neutral position by the springs 36, 38 when the percussion delivery unit 26 is not operating.

During operation, a motor 46 that is mounted on the gearbox 24 drives a gear assembly 48, which in turn causes vertical reciprocation of a connecting rod 50. The connecting rod 50 is coupled to the ram and shaft assembly 28 and therefore causes reciprocation of the ram and shaft assembly 28 and spring separator 34, which reciprocation is engaged by the upper and lower springs 36, 38. The springs 36, 38 act on the spring box 32 and cause the spring box 32 to reciprocate divergently relative to the reciprocations of the ram and shaft assembly 28. Shoe 27 attached to the lower end of the spring box 32 thus moves in a generally vertically oriented movement to compact the ground.

Figure 1:
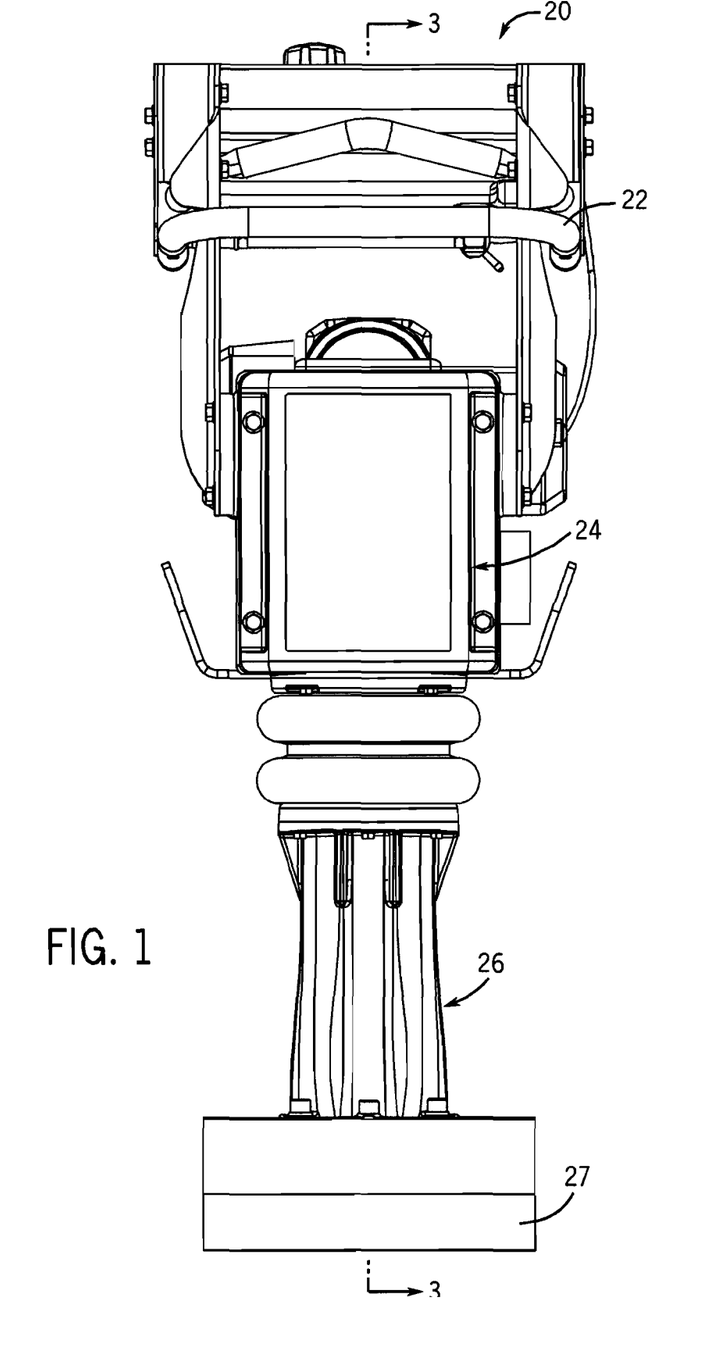
FIG. 1 is a front view of a rammer.
Figure 2:
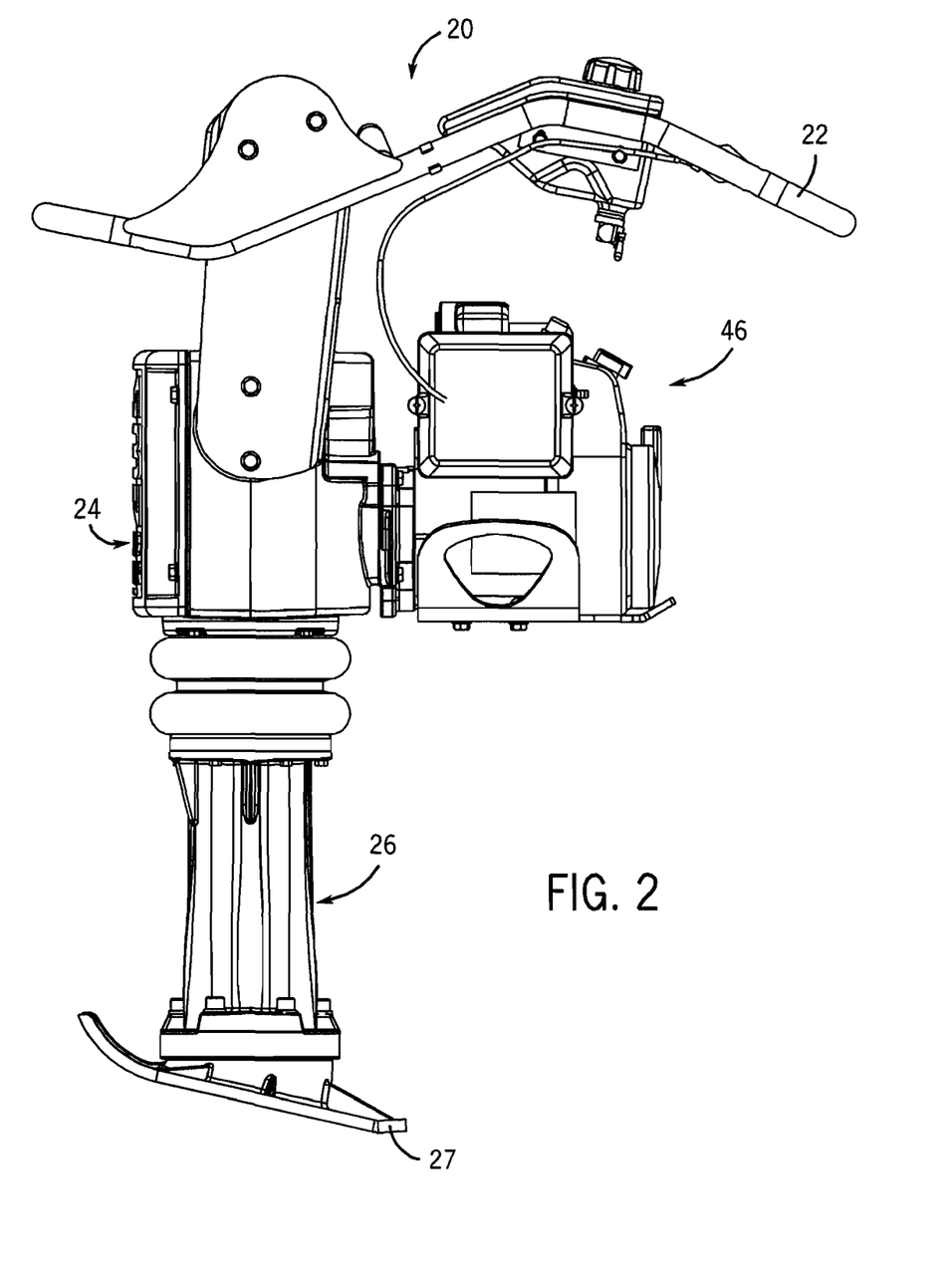
FIG. 2 is a side view of the rammer shown in FIG. 1.
Figure 3:
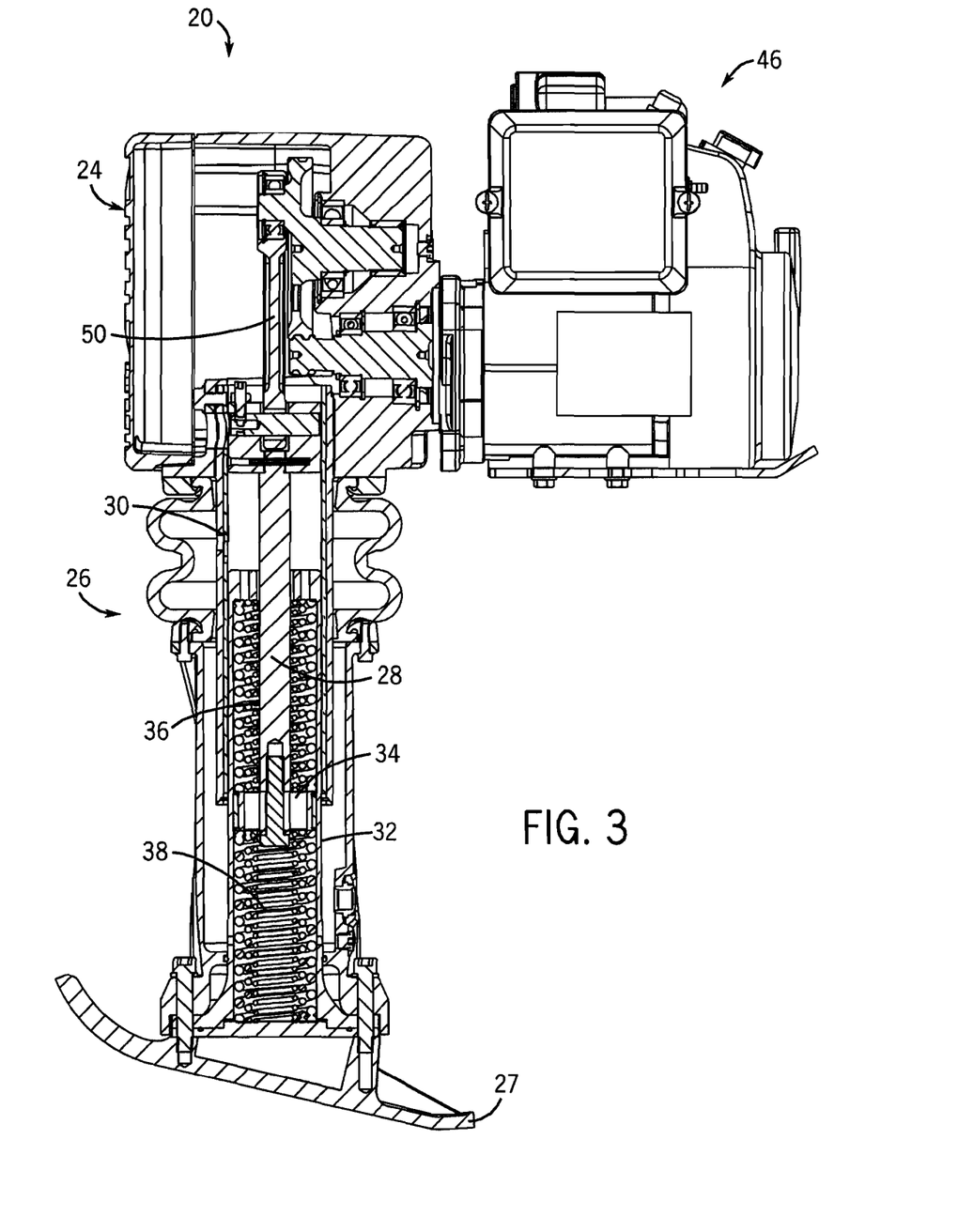
FIG. 3 is a view of Section 3-3 taken in FIG. 1.
Figure 4:
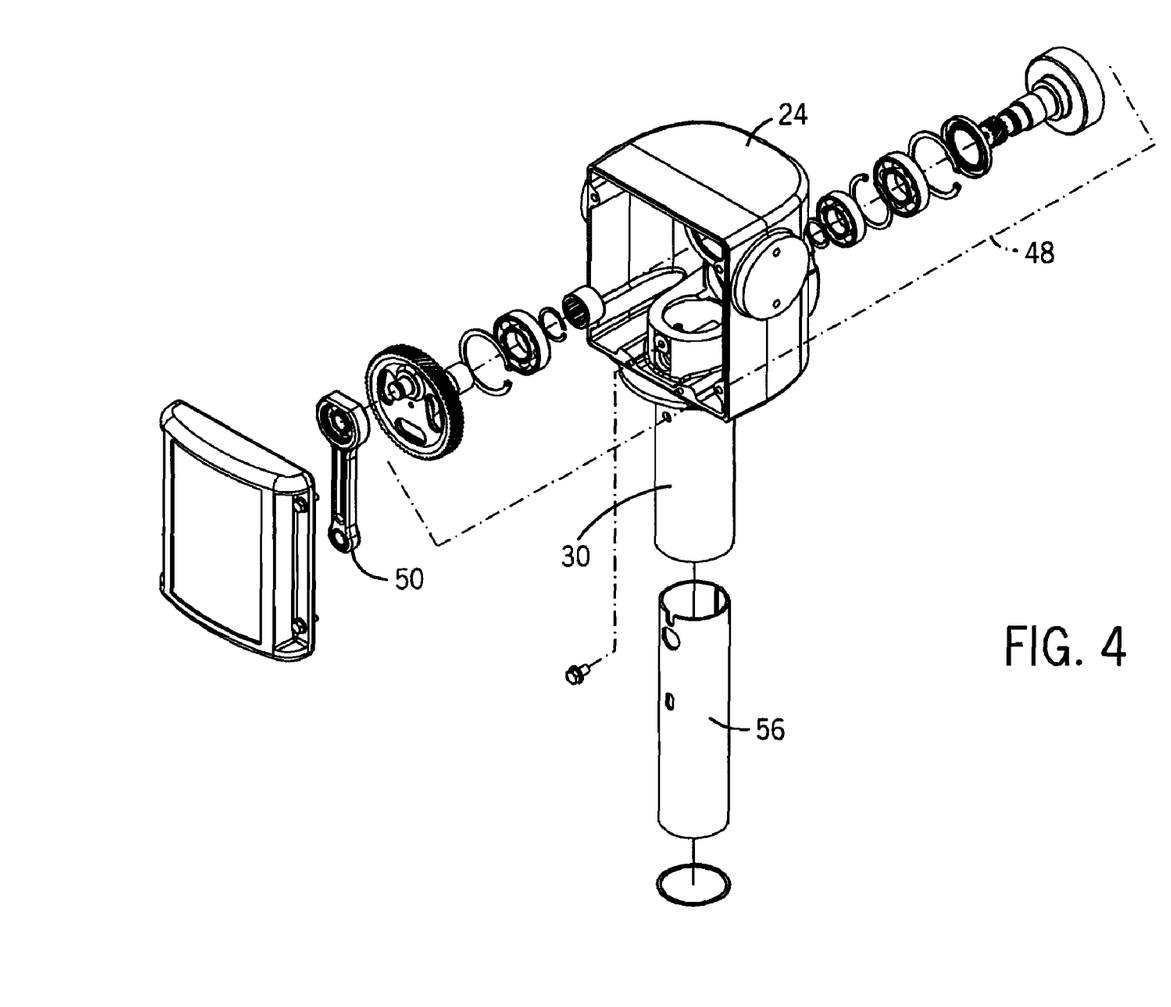
FIG. 4 is an exploded perspective view of parts of the rammer.
Figure 5:
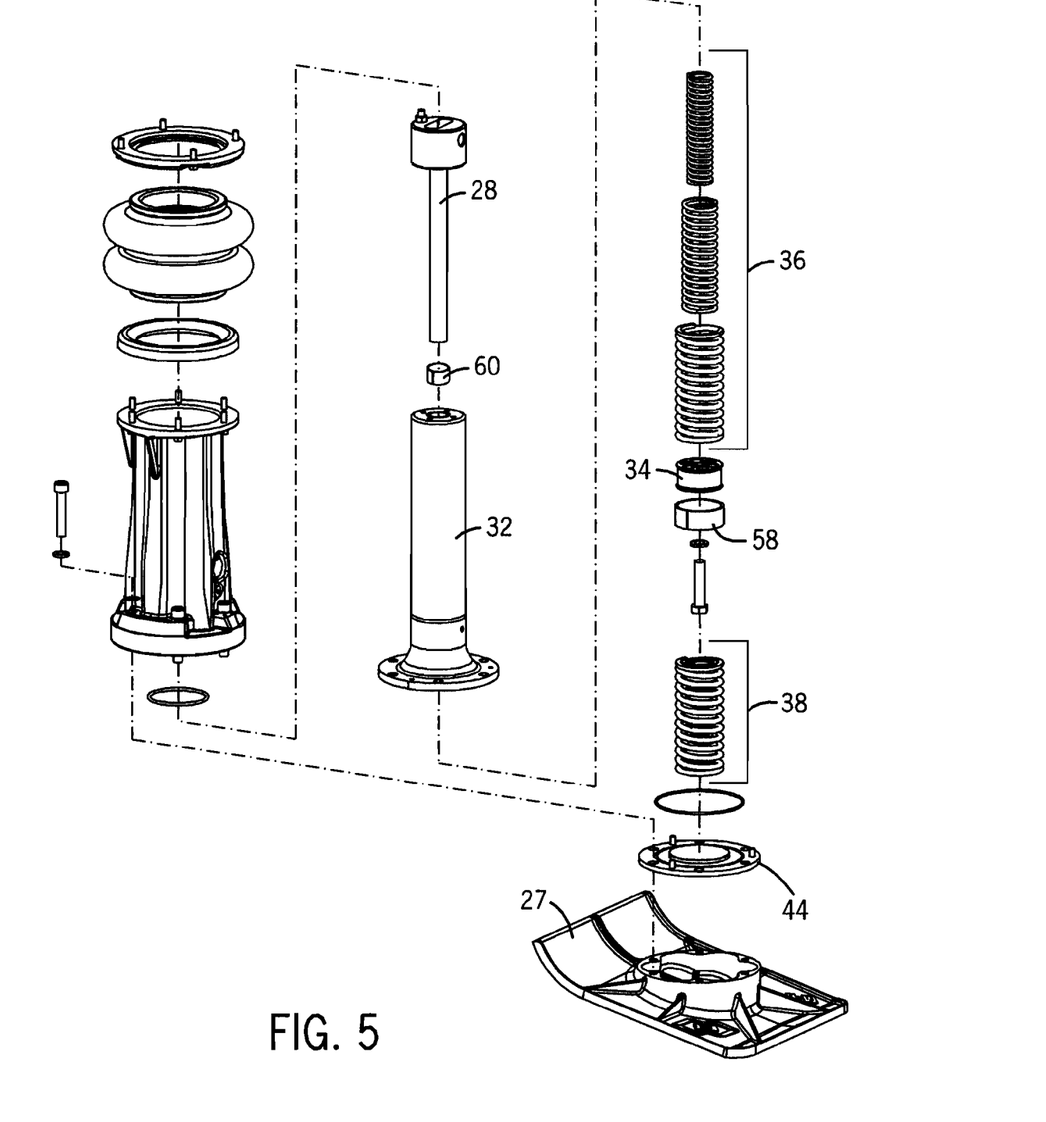
FIG. 5 is an exploded perspective view of parts of the rammer not shown in FIG. 4.
Figure 6:
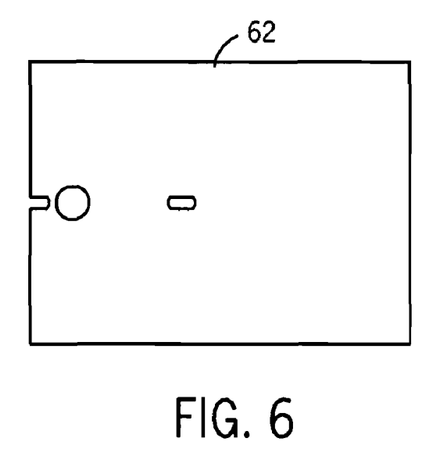
FIG. 6 is a top view of a sheet of non-metal material.
Figure 7:
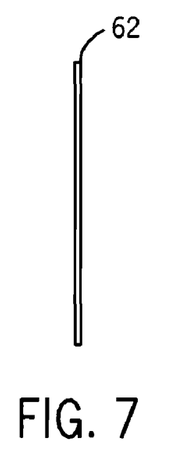
FIG. 7 is a side view of the sheet of non-metal material shown in FIG. 6.
Figure 8:
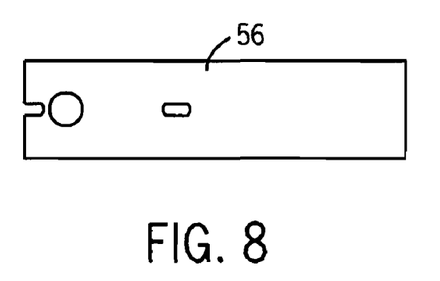
FIG. 8 is a front view of a slide bearing formed from the sheet of material shown in FIG. 6.
Figure 9:
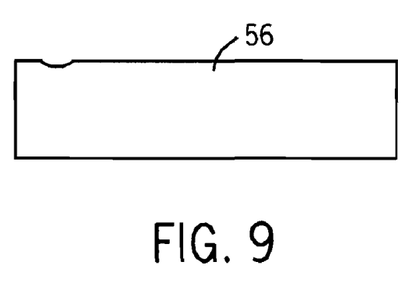
FIG. 9 is a side view of the slide bearing shown in FIG. 8.

As shown in FIGS. 3-5, a plurality of wear components are disposed in the percussion delivery unit 26 to eliminate metal-on-metal contact between adjacent metal surfaces or components. A slide bearing 56 is disposed between the inner surface of the guide cylinder 30 and the outer surface of the ram and shaft assembly 28 and spring box 32. A slide bearing 58 is disposed between the outer surface of the spring separator 34 and the inner surface of the spring box 32. A slide bearing 60 is disposed between the upper end of the spring box 32 and the outer surface of the shaft on the ram and shaft assembly 28.

Figure 10:
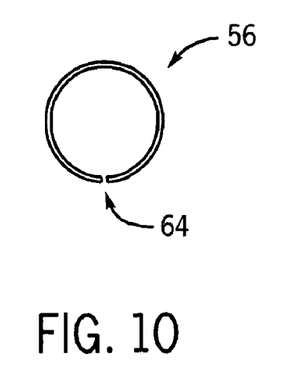
FIG. 10 is an end view of the slide bearing shown in FIG. 8.

FIGS. 6-10 show aspects of the slide bearing 56 in more detail. The slide bearing 56 is formed from a sheet 62 that is punched from a stock of non-metal material. In one example, the non-metal material comprises ultra-high molecular weight polyethylene, however any non-metal material suitable to provide a bearing surface between metal components can be used. In other examples, the sheet of non-metal material can include a composite material formed from ultra-high molecular weight polyethylene that is impregnated with for example bronze, graphite and/or the like. The sheet 62 is heated until malleable by for example a hot water bath or other suitable heating process and then formed into the shape of a tube having a C-shape in cross-section (FIG. 10). In one example, the sheet 62 is formed into the tube by heating the sheet 62 and then wrapping it around a cylindrical mandrel (not shown). In its formed state, the slide bearing 56 thus defines an open seam 64 extending through its entire length. Once formed, the slide bearing 56 is inserted into the percussion delivery unit 26 and is sandwiched between the guide cylinder 30 and the ram and shaft assembly 28 and the spring box 32. The slide bearing 56 thus prevents metal-on-metal contact between the inner surface of the guide cylinder 30 and the outer surface of the ram and shaft assembly 28 and the spring box 32.

Figure 11:
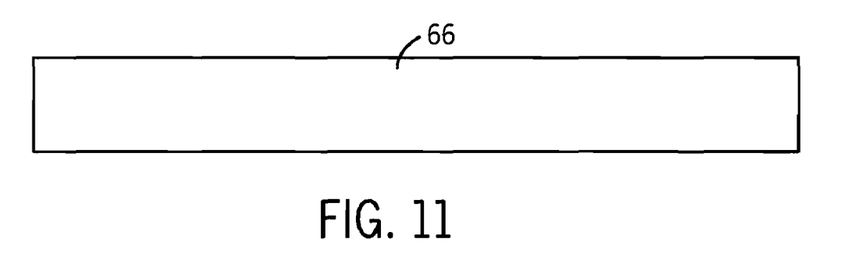
FIG. 11 is a top view of a sheet of non-metal material.
Figure 12:
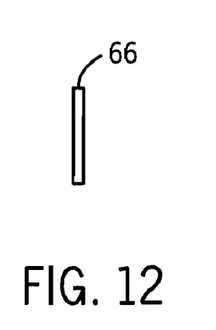
FIG. 12 is a side view of the sheet of material shown in FIG. 11.
Figure 13:
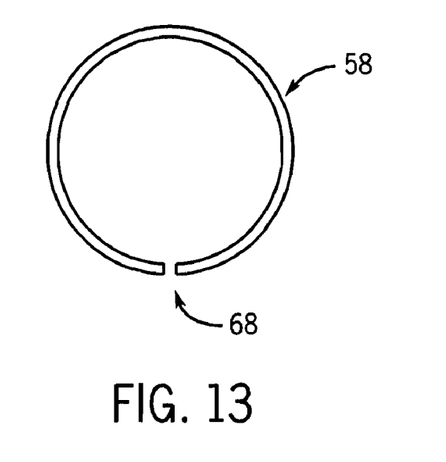
FIG. 13 is an end view of a slide bearing formed from the sheet of material shown in FIG. 11.

FIGS. 11-13 show aspects of the slide bearing 58 in more detail. The slide bearing 58 is formed from a sheet 66 that is punched from a stock of non-metal material. In the preferred arrangement, the non-metal material comprises polytetrafluoroethylene, however any non-metal material suitable to provide a bearing surface between metal components can be used such as ultra-high molecular weight polyethylene. For example, the non-metal material can include a composite material including polytetrafluoroethylene that is impregnated with for example bronze, graphite and/or the like. The sheet 66 is heated until malleable by for example a hot water bath or the like and then formed into the shape of a tube having a C-shape in cross-section (FIG. 13). In one example, the sheet 66 is formed into the tube by heating the sheet 66 and then wrapping it around a cylindrical mandrel (not shown). In its formed state, the slide bearing 58 thus defines an open seam 68 extending through its entire length. Once formed, the slide bearing 58 is inserted into the percussion delivery unit 26 and is sandwiched between the spring separator 34 and the spring box 32. The slide bearing 58 thus prevents metal-on-metal contact between the outer surface of the spring separator 34 and the inner surface of the spring box 32.

Figure 14:
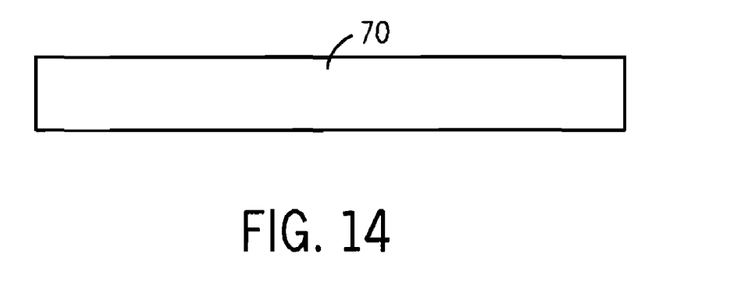
FIG. 14 is a top view of a sheet of non-metal material.
Figure 15:
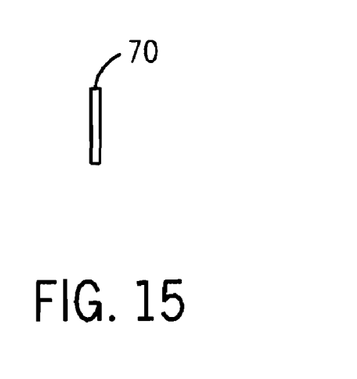
FIG. 15 is a side view of the sheet of material shown in FIG. 14.
Figure 16:
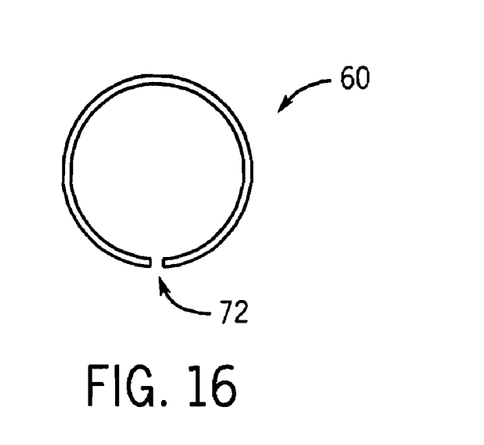
FIG. 16 is an end view of a slide bearing formed from the sheet of material shown in FIG. 14.

FIGS. 14-16 show aspects of the slide bearing 60 in more detail. The slide bearing 60 is formed from a sheet 70 that is punched from a stock of non-metal material. In the preferred arrangement, the non-metal material comprises polytetrafluoroethylene, however any non-metal material suitable to provide a bearing surface between metal components can be used, such as ultra-high molecular weight polyethylene. For example, the non-metal material can include a composite material including polytetrafluoroethylene that is impregnated with for example bronze, graphite and/or the like. The sheet 70 is heated until malleable by for example a hot water bath or other suitable heating process and then formed into the shape of a tube having a C-shape in cross-section (FIG. 16). In one example, the sheet 70 is formed into the tube by heating the sheet 70 and then wrapping it around a cylindrical mandrel (not shown). In its formed state, the slide bearing 60 thus defines an open seam 72 extending through its entire length. Once formed, the slide bearing 60 is inserted into the percussion delivery unit 26 at the top of the spring box 32 and between the spring box 32 and the shaft of the ram and shaft assembly 28. The slide bearing 60 thus prevents metal-on-metal contact between the outer surface of the shaft of the ram and shaft assembly 28 and the top of the spring box 32.

Forming the slide bearings 56, 58, 60 out of sheet material eliminates the expensive extrusion process required in the prior art. The sheet material is relatively inexpensive and easy to obtain in consistent sizes and relatively easy to fabricate into the shape of a tube having a C-shape in cross section. The sheets 62, 66, 70 can have various sizes and characteristics depending upon the particular application. Sheets of ultra-high molecular weight polyethylene and polytetrafluoroethylene are commonly available at any fractional thickness dimension starting at 0.03125 inches up to several inches thick. Both materials are also available as a thin film, as thin as 0.002 inches thick.

Advantageously, the methods described herein are much simpler than the prior art methods and result in a percussion rammer having slide bearings that are more functional and adaptable for use and less expensive to manufacture. According to the preferred methods described herein, a single elongated slide bearing can be easily and efficiently manufactured to provide a bearing surface along the entire elongated wear surface in the percussion delivery unit and smaller slide bearings manufactured to provide replaceable, low cost bearing surfaces on the outer diameter of the spring separator and the inner diameter of the spring box. The preferred methods described herein eliminate extrusion and machining processes that were previously necessary and that were found to be highly expensive and time consuming. Further, the total elimination of metal-on-metal reciprocating components in the delivery system significantly reduces the cost of rammer maintenance while extending rammer life relative to rammers lacking low cost, easily replaced wear surfaces with a lowered probability of incurring system jamming by virtue of material instability.

The open seams 64, 68, 72 provide the slide bearing with flexibility to change shape and size during installation and during rammer operation. The flexibility of the C-shaped slide bearings made from sheets of bearing materials facilitates easy installation or replacement wherever used in the rammer's percussion system. This also allows cost effective formation of a single elongated slide bearing 56 that serves to reduce friction along the entire length of the delivery unit 24.

Advantageously, the C-shape of the slide bearings provides more flexibility for the bearings to expand and contract in the cross-sectional direction in response to extreme rammer operating conditions such as temperature and friction and has thus been found to decrease the likelihood of jamming inside the delivery unit 24.

The open seams 64, 68, 72 are preferably selected to have a width that is greater than the anticipated expansion of the wear component, yet small enough to prevent metal-to-metal contact between adjacent rammer components. The C-shape of the bearings 56, 58, 60 allows the bearings to expand a greater distance in the cross-sectional direction. The wear component will therefore not expand as rapidly in other directions such as the radial direction as compared to the prior M-B-W, Inc. wear components.

In one example, the slide bearings 58 and 60 are made of polytetrafluoroethylene and the slide bearing 56 is made of ultra-high molecular weight polyethylene. It is not necessary to form the slide bearing 56 from the more expensive polytetrafluoroethylene because the operating conditions at the location of the slide bearing are not as extreme as at the locations of the slide bearings 58 and 60. In addition, the ultra-high molecular weight polyethylene is more unstable than the polytetrafluoroethylene under extreme operating conditions. Advantageously, the slide bearing 56 can therefore comprise the "weakest link" in the system in terms of failure under extreme operating conditions. In this example, the material of the slide bearing 56 can be selected such that the slide bearing 56 will fail prior to failure of any other expensive components in the rammer. If the machine enters into a failure mode, the weakest link, namely the slide bearing 56 will fail instead of any other expensive components. The slide bearing 56 is relatively low cost and easy to replace according to the methods described above. This facilitates a safety mechanism which saves significant cost that can be incurred to repair more expensive rammer components. A similar approach could potentially be taken with other slide bearings 58, 60.

The unique replaceable wear components described herein last longer than the wear surfaces of expensive metal components, create less friction and heat, preserve lubricant integrity, and produce less internal load for the engine of the rammer to overcome. Less friction, heat and wear in the delivery unit translates into lower horsepower demands to run the rammer, which means fewer engine and delivery system problems and longer overall product life.

What is claimed is:

1. A method of making a vibratory percussion rammer, the method comprising:
providing a motor-driven gearbox and a percussion unit extending downwardly from the gearbox, the percussion unit comprising
a ram and shaft assembly extending downwardly from the gearbox into a guide cylinder,
a spring box extending upwardly into the guide cylinder, and
a spring separator coupled to the ram and shaft assembly and disposed in the spring box between upper and lower springs,
the ram and shaft assembly configured to reciprocate up and down and the spring box configured to reciprocate divergently relative to the reciprocations of the ram and shaft assembly;
forming a plurality of slide bearings out of a plurality of sheets of non-metal material having a length and a width by shaping each sheet in the plurality of sheets into a tube having a C-shape in cross-section that defines an open seam having a width and extending along the entire length of the slide bearing;

inserting a first slide bearing from the plurality of slide bearings between the guide cylinder and the ram and shaft assembly and spring box, wherein the first slide bearing has an open seam that is wider than an anticipated width-wise thermal expansion of the first slide bearing during normal operation of the vibratory percussion rammer so as to prevent contact between the guide cylinder and the ram and shaft assembly and spring box;

inserting a second slide bearing from the plurality of slide bearings between the spring separator and spring box, wherein the second slide bearing has an open seam that is wider than an anticipated width-wise thermal expansion of the second slide bearing during normal operation of the vibratory percussion rammer so as to prevent contact between the spring separator and spring box;

inserting a third slide bearing from the plurality of slide bearings between an upper portion of the spring box and a shaft of the ram and shaft assembly, wherein the third slide bearing has an open seam that is wider than an anticipated width-wise thermal expansion of the third slide bearing during normal operation of the vibratory percussion rammer so as to prevent contact between the upper portion of the spring box and the shaft of the ram and shaft assembly; and selecting the material of said first slide bearing such that said first slide bearing will fail under extreme operating conditions prior to failure of either of the second or third slide bearings.

2. A method according to claim 1, wherein the first slide bearing comprises ultra high molecular weight polyethylene.

* * * * *